(12) United States Patent
Lunn

(10) Patent No.: US 8,338,741 B2
(45) Date of Patent: Dec. 25, 2012

(54) GROUND INDICATING DEVICE

(76) Inventor: Adam Ray Lunn, Wichita Falls, TX (US)

( * ) Notice: Subject to any disclaimer, the term of this patent is extended or adjusted under 35 U.S.C. 154(b) by 779 days.

(21) Appl. No.: 12/481,012

(22) Filed: Jun. 9, 2009

(65) Prior Publication Data

US 2010/0308021 A1 Dec. 9, 2010

(51) Int. Cl.
*B23K 10/00* (2006.01)
(52) U.S. Cl. .......... 219/121.59; 219/121.45; 219/121.46
(58) Field of Classification Search ............. 219/121.54, 219/121, 57, 121.39, 121.48, 125.1, 137 R, 219/140–143
See application file for complete search history.

(56) References Cited

U.S. PATENT DOCUMENTS

| | | | | |
|---|---|---|---|---|
| 6,091,048 A | * | 7/2000 | Lanouette et al. | 219/130.21 |
| 6,242,711 B1 | * | 6/2001 | Cooper | 219/130.01 |

* cited by examiner

*Primary Examiner* — Mark Paschall
(74) *Attorney, Agent, or Firm* — Mark A. Goodman, Esq.

(57) ABSTRACT

A device and method are provided for determining whether sufficient ground exists to perform processes such requiring the establishment of an electrical arc such arc welding or plasma cutting. The device is capable of fastening to at least one object placed in between a first contact surface and a second contact surface. The contact surfaces are composed of conductive material but separated by non-conductive material. The device further includes at least one light bulb coupled with an electrical circuit such that the electrical circuit coupled to the light bulb, broken only by non-conductive material separating the first contact surface and the second contact surface. A method of determining whether such sufficient ground exists by connecting an electrical circuit, coupled with a light bulb and broken only by the object, is also provided.

10 Claims, 2 Drawing Sheets

GROUND INDICATING DEVICE

FIELD OF THE INVENTION

The present invention relates to the areas of arc welding and plasma cutting, and more particularly, a ground indicating device.

BACKGROUND

Welding is a metal joining process in which two pieces of metal, touching each other, are melted at the edges by a welding gun to fuse them together. When the metals cool down, a strong bond is created. Welding can be done by using either pressure or by using a filler material. The heat can be provided by an electric arc, a gas flame, laser, electron beam, ultrasound, the electrical resistance of the metals, through a chemical reaction, or other methods. Types of welding processes such as spot welding, mig welding, TIG welding, seam welding, projection welding, gas welding, resistance welding, induction welding, thermal welding, and forge welding, etc. can be utilized.

Almost all types of metals such as: iron, steel, aluminum, brass, nickel, phosphor bronze, and tantalum, etc. can be welded by at least one of the processes. Some types of thermoplastics can also be welded.

Arc welding uses a power supply to create an electric arc between an electrode and the base material to melt the metals at the welding point. Either direct current (DC) or alternating (AC) current may be used. The process of arc welding is widely used because of its low capital and running costs.

In an arc welding circuit, the work-piece is generally held at or near ground potential while the arch electrode is maintained at a positive electric potential with respect to the work-piece. Electric discharge between the electrode and the work-piece occurs and the arc is defined.

The ground welding cable is connected to the work-piece by a ground clamp. For an arc welding process to function, there must be a sufficient ground (conductivity) between the ground clamp and the work-piece. Otherwise no electric arc circuit will be established. Depending on the work-piece, work environment, and other factors, it is often difficult to establish sufficient ground. Paint, oil, dirt, rust, moisture, and/or elements present on the work-piece or in the word environment factors often interfere with the conductivity of the work-piece so that sufficient ground is not established.

Lack of sufficient ground can cause the welding apparatus to shut down. Such a shut down can occur while the welder is welding, causing the welder to have to reset the ground clamp. Often, the ground clamp must be positioned at a substantial distance from the position where the weld must be made, making resetting the clamp highly inefficient.

With existing ground clamps, there is no way for the welder to know whether sufficient ground has been established before attempting to weld. Through experience, welders develop a knack for avoiding areas with rust, moisture, paint, dirt, and the like.

In addition to arc welding, determining whether sufficient ground exist is necessary for the related process of plasma cutting. Plasma cutting is a process that is used to cut steel and other metals (or sometimes other materials) using a plasma torch. In this process, an inert gas (in some units, compressed air) is blown at high speed out of a nozzle; at the same time an electrical arc is formed through that gas from the nozzle to the surface being cut, turning some of that gas to plasma. The plasma is sufficiently hot to melt the metal being cut and moves sufficiently fast to blow molten metal away from the cut.

An accurate and efficient way to assess whether sufficient ground exists will also aid in plasma gouging. Plasma gouging is a related process, typically performed on the same equipment as plasma cutting. Instead of cutting the material, plasma gouging uses a different torch configuration (torch nozzles and gas diffusers are usually different), and a longer torch-to-work-piece distance, to blow away metal. Plasma gouging can be used in a variety of applications, including removing a weld for rework. The additional sparks generated by the process requires the operator to wear a leather shield protecting their hand and forearm. Torch leads also can be protected by a leather sheath. This extra equipment may have to be taken on and off if the user finds he has not established sufficient ground.

Therefore, there exists a need for a ground clamp capable of indicating whether sufficient ground has been established immediately, consistently, and accurately.

DESCRIPTION OF THE PRIOR ART

Numerous innovations for welding apparatuses have been provided in the prior art that will be described. Even though these innovations may be suitable for the specific individual purposes to which they address, however, they differ from the present invention.

A FIRST EXAMPLE, U.S. Pat. No. 3,230,344, Issued on Jan. 18, 1966, to Glatthorn et al. teaches in arc welding with an electrode of a joint between abutting members from a side of the members not visible to the welding operator, the joint prior to being welded having a notch penetrating below the surface on the side of at least one of the members, the method of setting the electrode in welding relationship to the joint which comprises setting the electrode in contact with the surface of the one member adjacent the notch to close an electrical circuit including the electrode, the one member and an indicator indicating that the circuit is closed, moving the electrode in contact with the surface towards the notch until the indicator indicates that the circuit be opened, and thereafter moving the electrode away from the notch to the distance corresponding to the desired length of the welding arc.

A SECOND EXAMPLE, U.S. Pat. No. 3,621,177, Issued on Nov. 16, 1971, to McPherson et al. teaches a method and apparatus for fully automatically weld-joining lengths of metal instrument tubing employing the TIG welding process to advance a weld puddle about the periphery of the junction of aligned ends of straight tubing, respective end portions of which are held in a closed chamber rigidly clamped in spaced seats of a robust metal head to resist elongation by heating; the unit comprises a handle portion axially separably joined with the head and providing drive to a rotating electrode carrier spool therein about the work, angular interval marking signals being transmitted to a remote control unit from which welding current and gas is supplied to the head according to a weld program selected for the material being joined. A welding cycle commences with a stationary arc developing a weld pool, followed by advance at uniform speed of the arc with controlled current levels over sectors, the arc being sustained beyond 360.degree. and the complete cycle spanning two revolutions of the carrier and terminating with a bead-cooling gas flow. Repeatable welds of high quality on a production basis may be obtained, characterized by minimal fall-in of bead, full area fusion of faces, and constant internal diameter.

A THIRD EXAMPLE, U.S. Pat. No. 6,225,596, Issued on May 1, 2001, to Chandler et al. teaches a portable welding unit comprising a housing. The housing contains a first battery and a second battery connected in series. Each of the batteries is a sealed, non-spillable battery. Each battery has a positive terminal and a negative terminal. The welding unit has a first clamp electrically connected to the positive terminal of the first sealed, non-spillable battery. The first clamp extends outside the housing and is adapted to be connected to a ground of an object to be welded. A welding gun is electrically connected to the negative terminal of the second sealed, non-spillable battery. The welding gun extends outside the housing. A wire feed mechanism is located in the housing and is connected to the battery for extending wire through the welding gun. A spool of consumable electrode wire is rotatably connected to the housing. This wire is supplied to the welding gun via the wire feed mechanism. In operation, the user connects the first clamp to ground. Next, the user enables the unit so that power is supplied from the batteries contained in the housing. Once the unit is powered up and the gun trigger is activated, the wire electrode is supplied through the welding gun by the wire feed mechanism. The user may then begin welding.

It is apparent now that numerous innovations for welding apparatuses have been provided in the prior art that are adequate for various purposes. Furthermore, even though these innovations may be suitable for the specific individual purposes to which they address, they would not be suitable for the purposes of the present invention as heretofore described.

SUMMARY OF THE INVENTION

AN OBJECT of the present invention is to provide a ground indicating device that avoids the disadvantages of the prior art.

ANOTHER OBJECT of the present invention is to provide a ground indicating device that is simple and inexpensive to manufacture.

STILL ANOTHER OBJECT of the present invention is to provide a ground indicating device that is simple to use.

BRIEFLY STATED, STILL YET ANOTHER OBJECT of the present invention is to provide a ground indicating device, comprising a clamp capable of fastening to at least one object placed in between a first contact surface of the clamp and a second contact surface of the clamp. The first contact surface is composed of a first conductive material and the second contact surface is composed of a second conductive material. The first contact surface and the second contact surface are separated by a first nonconductive material. At least one light bulb is coupled with an electrical circuit, the electrical circuit being connected to a power supply. The electrical circuit is connected to the first contact surface and to the second contact surface. The circuit is therefore broken only by the first non-conductive material separating the first contact surface and the second contact surface. When the electrical circuit is completed, it will thereby turn the light-bulb on, when and only when both the first contact surface and the second contact surface are simultaneously in contact with the object capable of conducting a ground.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWINGS

The figures of the drawings are briefly described as follows.

REFERENCE NUMBERS

Figure 1:
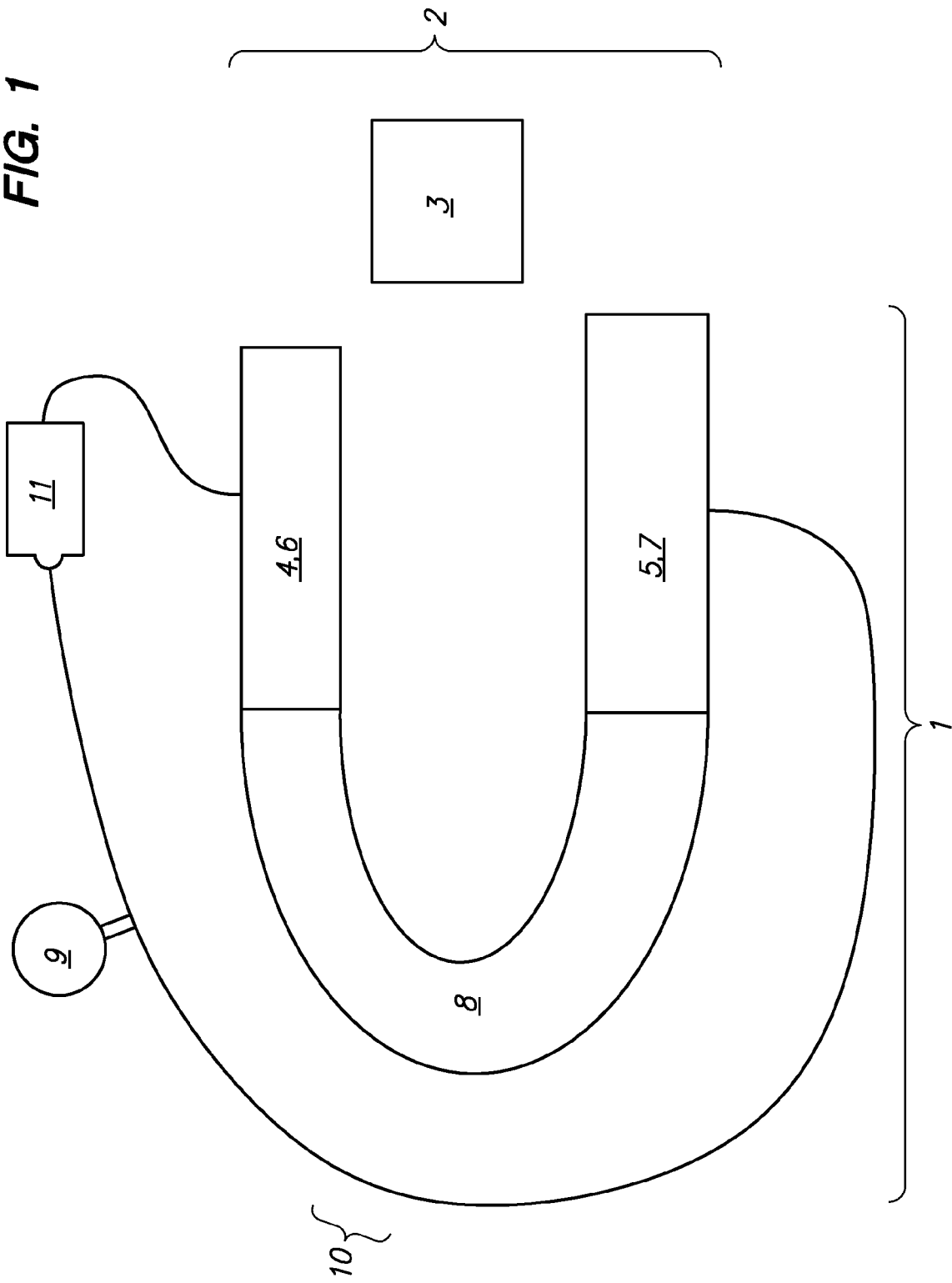
FIG. 1 is substantially a diagrammatic plan view of an embodiment of the present invention.

Throughout this description elements depicted in the figures shall be referenced by numbers. The following reference numbers correspond to the following elements:

1. a ground indicating device
2. a clamp
3. at least one object
4. a first contact surface
5. a second contact surface
6. a first conductive material
7. a second conductive material
8. a first non-conductive material
9. at least one light bulb
10. an electrical circuit
11 a power supply
12. a first protrusion
13. a third conductive material
14. a first pad
15. a second non-conductive material
16. a second protrusion
17. a fourth conductive material
18. a second pad
19. a third non-conductive material
20. at least one work-light
21. a first set of wire cutters
22. at least one gel grip
23. at least one serrated pick
24. a spring
25. a first handle
26. a second handle
27. a fourth non-conductive material
28. a first cutting blade
29. a second cutting blade
30. a second set of wire cutters

DETAILED DESCRIPTION OF THE PREFERRED EMBODIMENT

Referring now to the figures, in which like numerals indicate like parts, and particularly FIG. 1, which is a ground indicating device 1, comprising a clamp 2 capable of fastening to at least one object 3 placed in between a first contact surface 4 of the clamp 2 and a second contact surface 5 of the clamp 2. The ground indicating device seeks to determine whether sufficient ground exists across the object 3. The first contact surface 4 is composed of a first conductive material 6 and the second contact surface 5 is composed of a second conductive material 7. Any conductive material will function adequately here including, without limitation, iron, steel, copper, silver, aluminum, or gold. The first contact surface 4 and the second contact surface 5 are separated by a first non-conductive material 8.

Numeric references to different conductive materials serve only to reference where in the configuration of the invention a conductive material should be placed. Each numerically referenced conductive material may be the same material or a different material as subsequently referenced conductive materials. For instance, the first conductive material 6 may be the same material as the second conductive material 7 or it may be made of a different conductive material.

Likewise, the phrase "non-conductive material(s)" referenced herein may include any type of material that is a poor conductor of electric current. Examples of non-conductive materials include, but are not limited to: wood, plastic, rubber, numerous well-known synthetic materials, leather, fabric, glass, stone, or resin. Further, each numerically referenced non-conductive material may be the same material or a different material as subsequently referenced non-conductive materials. For instance, the first non-conductive material 8 may be the same material as the second non-conductive material 15 or it may be made of a different conductive material.

At least one light bulb 9 is coupled with an electrical circuit 10. As used in the in this application, the term "light bulb" shall include any type of electrically activated light emitting device, including, without limitation, incandescent light bulbs, fluorescent light bulbs, halogen lights, or light emitting diodes (often referred to as LED's).

The electrical circuit 10 is connected to a power supply 11. This power supply 11 could comprise any type of power supply known to those of skill in the art. Without limitation, this could include a battery, a solar panel, connection to a generator, or connection to an electrical outlet. The electrical circuit 10 is connected to the first contact surface 4 and to the second contact surface 5. The circuit 10 is therefore broken only by the first non-conductive material 8 separating the first contact surface 4 and the second contact surface 5. When the electrical circuit 10 is completed, it will thereby turn the light bulb 9 on, when and only when both the first contact surface 4 and the second contact surface 5 are simultaneously in contact with the object 3, if the object is capable of conducting a ground.

Figure 2:
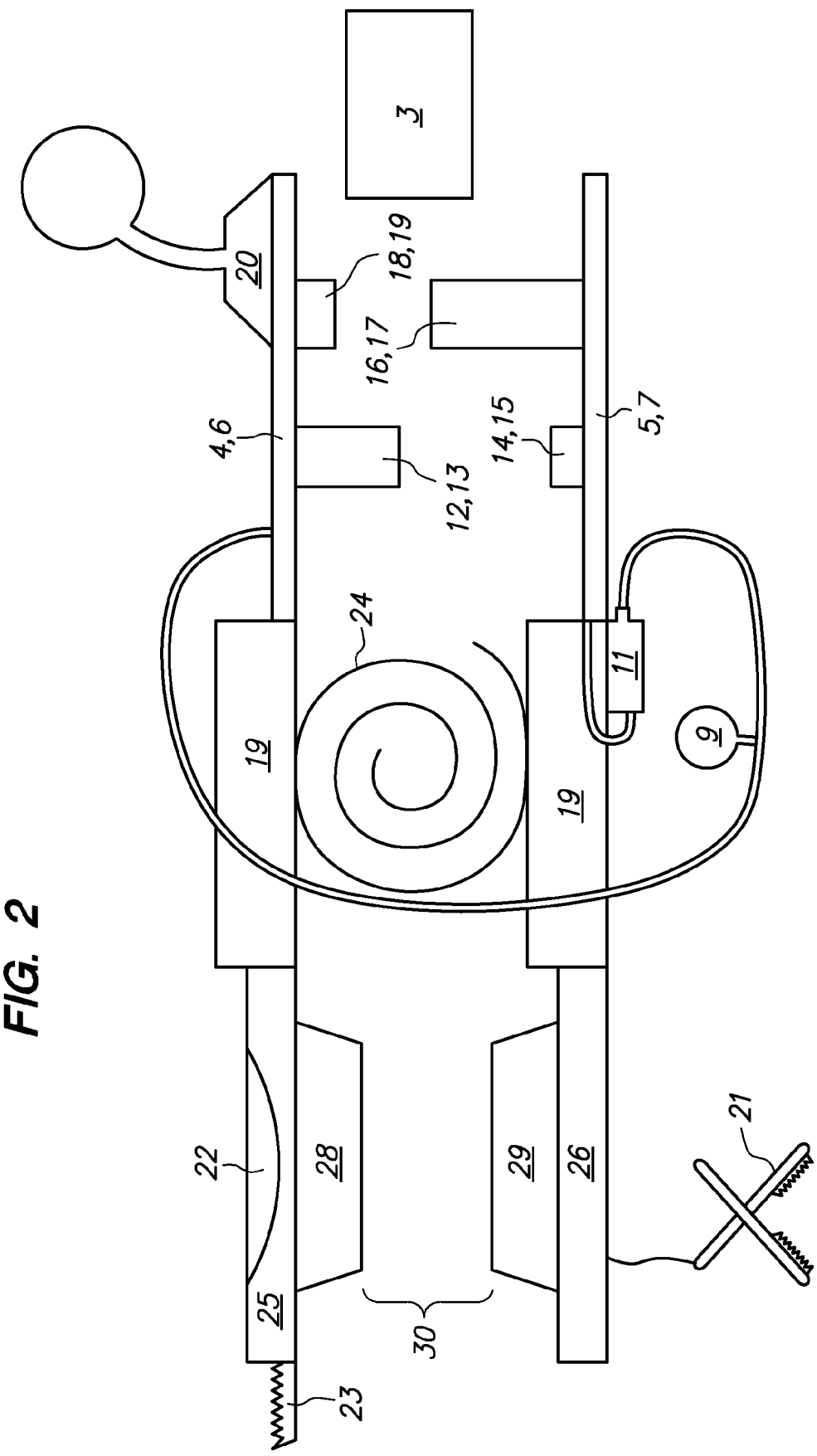
FIG. 2 is a diagrammatic side view of the present invention.

The ground indicating device 1, as shown in FIG. 2, may further contain a set of protrusions extending from the contact surfaces. Optionally, a first protrusion 12 extending from the first contact surface 4. The first protrusion 12 is composed of a third conductive material 13. A first pad 14 may be attached to the second contact surface 5. The first pad 14 is preferably composed of a second non-conductive material 15. The second protrusion 16 may extend from the second contact surface 5. The second protrusion 16 is composed a fourth conductive material 17. A second pad 18 is attached to the first contact surface 4. The second pad 18 is composed of a third non-conductive material 19. The first protrusion 12 is configured to rest on the first pad 14 when the clamp 2 is closed without the object 3. The second protrusion 16 is configured to rest on the second pad 18 when the clamp 2 is closed without the object 3.

The ground indicating device 1 may further include at least one work-light 20 attached thereto. The first set of wire cutters 21 may be attached to the ground indicating device 1. At least one gel grip 22 is also optionally integrated into the ground indicating device 1. In still another option, at least one serrated pick 23 is attached to the ground indicating device 1.

Optionally, the clamp 2 is actuated by a spring 24. The clamp 2 has a first handle 25 and a second handle 26. The first handle 25 and the second handle 26 are coupled to the spring 24 and separated from the circuit 11 by a fourth non-conduction material 27. The first handle 25 is connected to a first cutting blade 28 extending in substantially the direction of the second handle 26. A second cutting blade 29 is connected to the second handle 26. The second cutting blade 29 extends in substantially the direction of the first handle 25, thereby forming a second set of wire cutters 30 between the first handle 25 and the second handle 26.

Another aspect of the present invention comprises a method of determining whether there is a sufficient ground across the object 3 to establish a sufficient electrical arc to successfully complete a process selected from the group consisting of welding, plasma cutting, and plasma gouging; comprising the following steps, not all necessarily in the order shown:

1. Fastening the electrical circuit 11 to a first side of the object 3, the circuit 11 being coupled with the at least one light bulb 9.
2. Fastening the electrical circuit 11 to a second side of the object 3 wherein the circuit 11 is broken only by the object 3.
3. Observing the condition of the light bulb 9, whereby an electrical arc is established when the light bulb 9 is illuminated.
4. Connecting the circuit 11 to the clamp 2, wherein the clamp 2 includes a first contact surface 4 of the clamp 2 and a second contact surface 5 of the clamp 2, both the first contact surface 4 and the second contact surface 5 are composed of the conductive material 6 and 7, wherein the first contact surface 4 and the second contact surface 5 are separated by the first non-conductive material 8.

The present invention provides numerous advantages over the prior art, each advantage not necessarily present in each and every embodiment of the invention.

One advantage is that the present invention will allow a welder or plasma cutter to conveniently determine whether the material to be welded or cut is capable of conducting a ground. As described earlier, such conduction is required for the processes of arc welding and plasma cutting to function properly. The current market provides no device capable of indicating whether sufficient ground exists until it is too late. For example, a welder often must often set the welding clamp and then walk and sometimes climb a significant distance in order to reach the point where the weld is to be made, all the time trusting that sufficient ground exists to make the weld. At this point the welder might find that because the material did not in fact have sufficient ground, the welding machine malfunctions and shuts down. This makes the welder have to start over.

The combination of a welding clamp having a ground indicating device as described and with built in specialty tools provides a further advantage of the present invention. The invention may include a set of wire cutters and/or a serrated pick. A use needs to trim his welding rod and wire causing him to have to stop his project and make his way to the work bench to find the right tool. With wire cutters attached to and/or built into the ground indicating device, this extra effort is no longer required. Having a serrated pick built in to the ground indicating device provides extra convenience in a similar manner. In welding, a serrated pick is used to clean the welding nozzle of splatter build-up and debris from welding.

It will be understood that each of the elements described above, or two or more together, may also find a useful application in other types of constructions differing from the types described above.

While the invention has been illustrated and described as embodiments of a ground indicating device, accordingly it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapted for various applications without omitting features that, from the standpoint of the prior art, fairly constitute characteristics of the generic or specific aspects of this invention.

What is claimed is:

1. A ground indicating device, comprising:
   (A) a clamp capable of fastening to at least one object placed in between a first contact surface of the clamp and a second contact surface of the clamp, the first contact surface being composed of a first electrically conductive material and the second contact surface being composed of a second electrically conductive material, wherein the first contact surface and the second contact surface are separated by a first electrically non-conductive material;
   (B) at least one, visual indicator coupled with an electrical circuit, the electrical circuit being connected to a power supply; wherein:
      (a) the electrical circuit is connected to the first contact surface and to the second contact surface, whereby the circuit is therefore interrupted only by the first electrically non-conductive material separating the first contact surface and the second contact surface;
      (b) the electrical circuit is completed, thereby activating the visual indicator, when and only when both the first contact surface and the second contact surface are simultaneously in contact with an object capable of conducting a ground.

2. The ground indicating device of claim 1 further comprising:
   (A) a first protrusion extending from the first contact surface, the first protrusion being composed of a third electrically conductive material;
   (B) a first pad attached to the second contact surface, the first pad being composed of a second electrically non-conductive material;
   (C) a second protrusion extending from the second contact surface, the second protrusion being composed of a fourth electrically conductive material;
   (D) a second pad attached to the first contact surface, the second pad being composed of a third electrically non-conductive material;
   (E) the first protrusion is configured to rest on the first pad when the clamp is closed without the object;
   (F) the second protrusion is configured to rest on the second pad when the clamp is closed without the object.

3. The ground indicating device of claim 1 further comprising at least one work-light attached to the ground indicating device.

4. The ground indicating device of claim 1 further comprising a first set of wire cutters attached to the ground indicating device.

5. The ground indicating device of claim 1 further comprising at least one gel grip integrated into the ground indicating device.

6. The ground indicating device of claim 1 further comprising at least one serrated pick attached to the ground indicating device.

7. The ground indicating device of claim 1 wherein:
   (A) the clamp is actuated by a spring;
   (B) the clamp has a first handle and a second handle, the first handle and the second handle being coupled to the spring and separated from the circuit by a third electrically non-conductive material;
   (C) the first handle is connected to a first cutting blade extending in substantially the direction of the second handle.

8. The ground indicating device of claim 7, further comprising:
   (A) a second cutting blade connected to the second handle;
   (B) the second cutting blade extends in substantially the direction of the first handle, thereby forming a second set of wire cutters between the first handle and the second handle.

9. A method of determining whether there is a sufficient ground across an object to establish a sufficient electrical arc to successfully complete a process selected from the group consisting of welding, plasma cutting, and plasma gouging; comprising:
   (A) fastening an electrical circuit to a first side of the object, the circuit being coupled with at least one visual indicator coupled with the electrical circuit, the electrical circuit being connected to a power supply;
   (B) fastening the electrical circuit to a second side of the object wherein the circuit is interrupted only by the object;
   (C) observing the condition of the visual indicator, whereby an electrical arc is established when the visual indicator is illuminated.

10. The method of claim 9, further comprising;
   (A) connecting the circuit to a clamp, wherein the clamp includes a first contact surface of the clamp and a second contact surface of the clamp, both the first contact surface and the second contact surface being composed of an electrically conductive material, wherein the first contact surface and the second contact surface are separated by a first electrically non-conductive material.

* * * * *